Sept. 15, 1936. E. L. GRIFFITH 2,054,625
MANUFACTURE OF MEAT CURING SALT
Filed Nov. 7, 1934
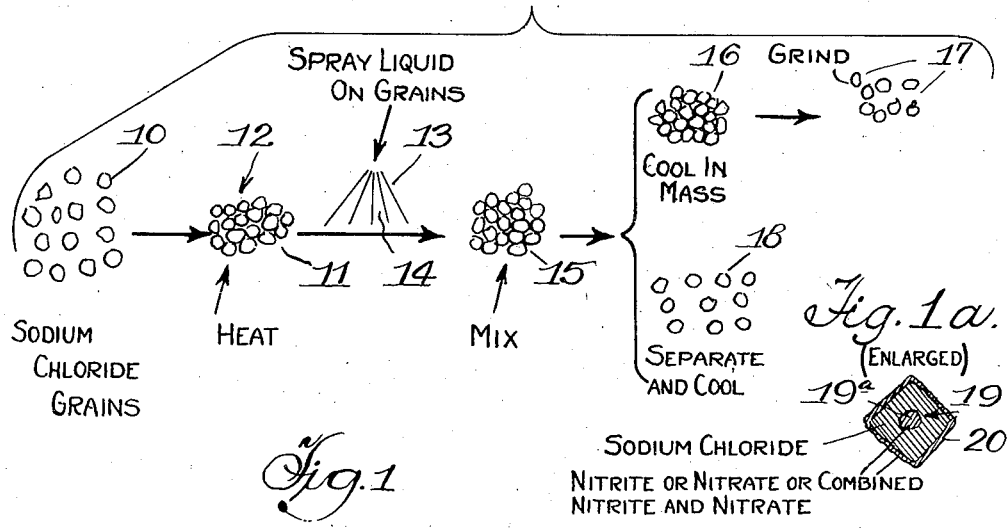
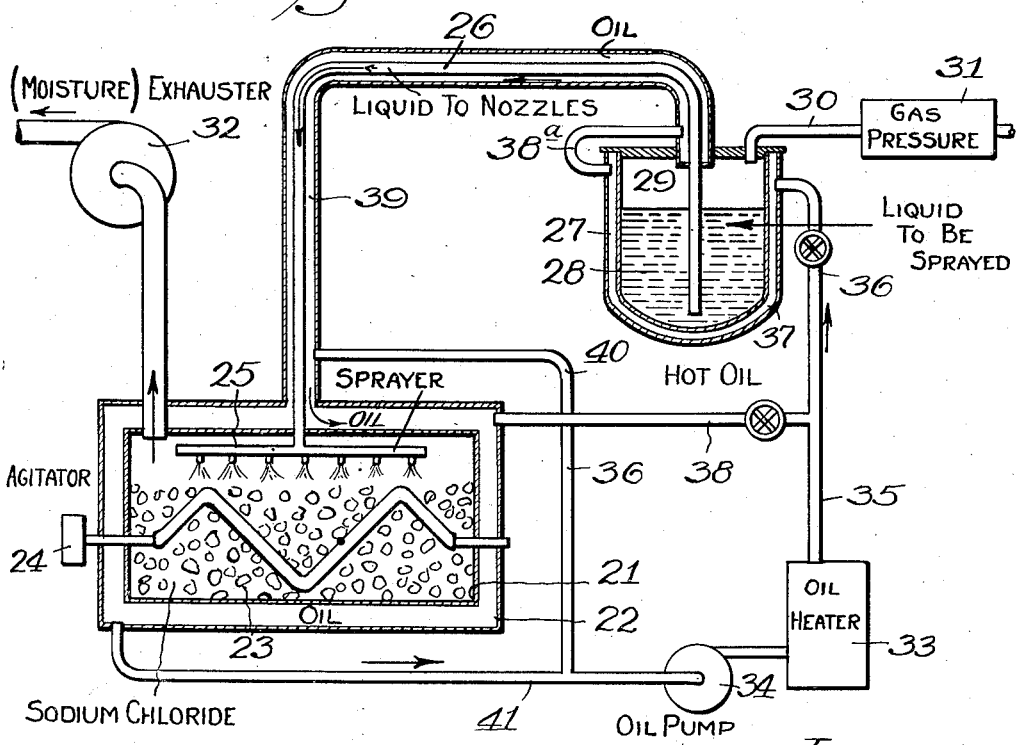

Patented Sept. 15, 1936

2,054,625

UNITED STATES PATENT OFFICE 2,054,625

MANUFACTURE OF MEAT CURING SALT

Enoch L. Griffith, Chicago, Ill., assignor to The Griffith Laboratories, Inc., Chicago, Ill., a corporation of Illinois Application November 7, 1934, Serial No. 751,887

12 Claims. (Cl. 99—222)

The present invention relates to curing salt for treating meat and the like, to the process of curing such material, and to methods of making such salt.

Since ancient times sodium chloride has been used as a meat preservative. Long ago it became known that nitrate of sodium or potassium in addition to salt, was beneficial. In particular the mixture reddened the meat and its color and appearance was better. It then became known that nitrate alone was of value individually in improving the color and appearance of meat. Subsequently it was discovered that the effectiveness of nitrate was due to nitrate being changed to nitrite, and it was also learned that the nitrite itself was changed into nitrous acid, which is the effective agent in producing a red color by union with hemoglobin of blood to form what is termed NO-hemoglobin.

It therefore became a practice to use both nitrate and nitrite with or without sodium chloride. For many years these combinations were produced by mixing the ground crystals of the respective salts. Such combinations have two types of disadvantages. The first is in respect to the constancy or uniformity of composition in a mechanical mixture. The second is in respect to the action of the mixture in the dry salt process of curing. These disadvantages are of great importance in commerce in the curing salt, and in the packing industry in curing meats.

The use of nitrates and nitrites in curing meats is regulated by law in most civilized states because of physiological detriment from intentional or accidental use of an excess. The nitrite is the one most particularly objected to, and in some countries its use is prohibited. In the United States, as in other countries, much discredit has been thrown upon mechanical mixtures of any of the suitable salts of chloride, nitrate, and nitrite. However uniformly the separate ingredients may be mixed by mechanical means, the subsequent disturbance of the mixture (as in handling, packing, shipping, etc.) causes a separation or concentration of one or more ingredients. Thus a bulk mass of the mixture remote in time or space from the mixing mill, may exhibit a non-homogeneous composition, one particular disadvantage being that it is possible innocently to use a mixture exceeding the legal limits for nitrate or nitrite. There are many instances where the United States governmental bureaus have complained of this very effect, where the salt mixture is made at one place and is shipped to another. Excess of nitrite has been a particular ground of objection.

The foregoing changes in composition also give the packer trouble, because the curing salt, for example from the top of a barrel, is different from the curing salt at the bottom of a barrel, and a packer's process or product from the respective portions of the barrel may be different, whether he uses the salt in a wet pickle or in a dry pickle.

The second disadvantage lies in the action of the curing salt on the meat. The individual salt components have different speeds of penetration and different effects on the color and form of the tissues. Sodium chloride is relatively slow in its progress into meat and the like. Nitrate is faster, but nitrite is still very much faster. Where these salts or any two of them, are together as separate crystals on a meat surface, it follows that from each crystal the salt moves at different speeds into the meat. These salts on entering the meat have different effects on the tissues of the meat. Nitrite in particular opens the pores of the meat to permit exudation of the spoilable juices in the meat, and to promote entry of nitrite. This release of meat fluids must not be so fast that it washes away the dry salt on the surface. It is therefore important where nitrite is used to minimize its sole effect with resulting quick penetration and action on the meat. The nitrate alone has a constricting effect on the pores of the meat, and therefore its sole effect is not particularly objected to. By combining the two a control of penetration may be effected, where absence of nitrite alone is maintained.

The present invention aims to overcome or minimize these disadvantages in a practical way.

One object of the invention is to provide a salt mass or curing unit in which there are on the average no individual grains or particles of the mass which are nitrite crystals or particles.

Another object of the invention is to provide a salt mass or curing unit in which, on the average, the grains or particles are each a complex grain containing both nitrate and nitrite.

Still another object of the invention is to provide a salt mass in which, on the average the grains or particles are each a complex grain containing sodium chloride, a nitrite and a nitrate, and which may have sodium chloride in predominant quantity, and nitrite predominating over nitrate.

A further object of the invention is the provision of a salt mass in which the average particle is a grain of sodium chloride which carries the nitrate and the nitrite on the outside.

Still another object of the invention is the provision of processes for making salt grains of the character above specified.

Another object of the invention is the provision of a product comprising sodium chloride grains coated with combined nitrite and nitrate.

It is also an object of the invention to provide a process of coating sodium chloride grains with a nitrite, a nitrate, or a combination of nitrite and nitrate.

For the advantage relating to avoiding the separation of mechanical mixtures the invention in process and product concerns sodium chloride grains carrying nitrite alone, nitrate alone, or nitrite and nitrate combined.

In carrying out the process it is necessary to consider melting points of nitrites, of nitrates, of mixed nitrites and nitrates, and also solubilities of the same in water. This information can be readily found, in the literature or by experiment without any difficulty. Sufficient pertinent information, as determined or reported, to support the illustrative examples is given below:

*Table I*

| Substance | Approximate melting point |
|---|---|
| | ° C. |
| Potassium nitrate | 337 |
| Potassium nitrite | 297.5 |
| Sodium nitrate | 308 |
| Sodium nitrite | 271 |
| Sodium chloride | 804 |
| Mixed: Sodium nitrite 60% / Sodium nitrate 40% | 230 |
| Mixed: Sodium nitrite 60% / Potassium nitrate 40% | |
| Begins to melt at | 126 |
| and is completely liquid and transparent at | 156 |
| Mixed: Potassium nitrite 60% / Sodium nitrate 40% | |
| Begins to melt at | 139 |
| and is completely liquid and transparent at | 172 |

*Table II*

| Substance | Temperature | Parts soluble in 100 parts water |
|---|---|---|
| | ° C. | |
| Sodium nitrite | 100 | 162 |
| Sodium nitrate | 100 | 175 |
| Potassium nitrite | 120 | 437 |
| Potassium nitrate | 110 | 293 |

*Fusion point of mixtures*

There are some peculiar facts about the fusion points of mixtures. When dry nitrites and nitrates are mixed for fusion, the melting point is sharp when the same metal bases, such as sodium, are used in both salts. Where the metal bases differ, the melting point is spread over a wide range. This is believed due to a shifting of the equilibrium between the two salts forming perhaps four salts. It is also noted that where the metal bases differ the melting point is lower than when the metal base is the same for both salts.

Where a solution of the two salts is quickly evaporated down, as by placing a thin layer of it on a hot surface, the residue appears to have a still lower melting point than where dry salts are mixed and fused. It is believed that water enters into the fusion mass to a slight extent, and effects a lowering of the fusion point of the same salt ingredients minus said water. For example where the mixed dry salts of 60% potassium nitrite and 40% sodium nitrate have a clarity melting point of 172° C., a strong solution of the same proportion of the same salts spread thinly on a hot surface having a temperature of 140° to 160° C., remains on said surface as a fused liquid mass.

According to the present invention the surface of sodium chloride crystals is utilized as a depository for nitrite or nitrate, or mixed nitrite and nitrate. Preferably the crystals are heated so that they provide hot surfaces on which the deposited substance is melted and spread to coat the crystal. Mixtures of nitrate and nitrite are preferred, and are more advantageous to work because lower fusion points prevail. Strong solutions, such as saturated or under-saturated solution, of nitrite, or of nitrate, or of mixed nitrite and nitrate may also be used and applied to the surfaces of sodium chloride crystals. A solution of mixed nitrite and nitrate is preferred because of the lower working temperatures permitted.

In practice a solution, or a fused salt or salt mixture, is coated onto the sodium chloride crystals. This may be done in numerous ways, such as tumbling sodium chloride in a heated drum, the surface of which is coated with the liquid substance.

The preferred practice is to provide a mass of heated sodium chloride in a vessel which effectively churns the crystals with agitation to expose the crystals at a surface of the mass. Onto the sodium chloride crystals so agitated a liquid is sprayed which contains the salt substance to be coated on. The liquid may be the fused salt substance, such as a single salt or a mixture of salts, or it may be a strong solution of a single salt or a mixture of salts.

Where a strong solution is sprayed onto the hot sodium chloride crystals, means is provided for carrying away the water vapor which is boiled from the solution. It is therefore important to effect this boiling off, that the temperature of the sodium chloride crystals be high enough to boil off the water. It is preferred to have the temperature of the sodium chloride so high that it effects fusion of the residue from the evaporation.

Where a fused or a finely divided salt or mixture is sprayed onto the sodium chloride crystals the temperature of the salt crystals is sufficient to keep the mass in a fused state, until all of the sodium chloride can be uniformly mixed with the fused substance. In either case where sodium chloride is hot enough to maintain a fused coating thereon, the crystals remain separate and can be agitated until thorough and uniform mixture has been attained. Then the mass is allowed to cool, and preferably quickly to avoid fractional crystallization, maintaining preferably a strong agitation. The cooling mass may be spread out into a thin film or sprinkled while hot through a cooling atmosphere, as by dropping it through a tower, to allow the fused mass which coats the crystals, to solidify. However the cooling is effected any two coated grains in contact, while having their coatings solidify, will freeze together at the zone of contact. Because of the small percentage of coating material in the preferred forms, the freezing is not detrimental to a simple grinding operation to break the points of contact. Where the salt is to be used in a wet pickle, it is not necessary to grind the mass into a fine-grained powdery form. It may be provided in small or large fused-together lumps obtained from cooling the fusion. Where the salt is to be used in a dry curing process it may be ground to break the points of contact.

The above described method is a batch process by which measured quantities of the materials are combined. A continuous process may be carried out where supply of the quantities of sodium chloride, and of liquid to be sprayed, is properly controlled. A moving surface, such as a flat endless belt, or a roll, may carry a limited depth of hot sodium chloride crystals. Onto the top of the layer the liquid may be sprayed. The coating becomes fused on the top layer and then the whole layer may be removed from the belt and mixed to render the ingredients homogeneously distributed. The product may be chilled in a mass or while hot may be extended to separate the grains in any suitable manner, and the separated grains allowed to cool.

Where a hot roll is used as the continuous surface, it may be conveniently coated with sufficiently adhering sodium chloride by wetting it with a strong solution of sodium chloride, from which the water is quickly evaporated to leave a thin residue of sodium chloride crystals as a sort of blanket.

The salt solution so used may contain nitrite or nitrate, or mixed nitrite and nitrate, preferably of sodium or potassium. As described in the Seifert Patent No. 1,950,459, small quantities of other salts dissolved with larger quantities of sodium chloride, and so treated, form a salt product which is homogeneous in composition. As described in my applications Serial No. 671,644, filed May 18, 1933; Serial No. 723,226, filed April 30, 1934; and Serial No. 750,705, filed October 30, 1934, nitrite, or nitrate, or mixed nitrite and nitrate, may thus be employed in a sodium chloride solution. The product is a sodium chloride crystal with a heart-like center of the nitrite, nitrate, or mixed nitrite and nitrate. Such heart-carrying crystals of sodium chloride may be used in the present process in place of the normal crystals of sodium chloride, and the two processes can be combined as above indicated.

Thus, it is possible to provide grains of sodium chloride which may have on the inside: nitrite, nitrate, or combined nitrite and nitrate, and which may have on the outside, nitrite, nitrate, or combined nitrite and nitrate. Herein, where I use the term "grain" or "crystal" of sodium chloride, I refer to the grain which is essentially sodium chloride on the outside, whether or not there are heart-like centers of other material therein.

Numerous practical combinations of sodium chloride, nitrite and nitrate (with or without water to spray) may be made as shown by the parts of the substances set forth in the following table.

Table III

| Substance | 1 | 2 | 3 | 4 | 5 | 6 | 7 | 8 | 9 | 10 |
|---|---|---|---|---|---|---|---|---|---|---|
| Sodium chloride grains | 90 | 80 | 93 | 88 | 90 | 80 | 90 | 90 | 94 | 99.5 |
| Sodium nitrite | 6 | 12 | 5 | 10 | 10 |  | 6 |  |  |  |
| Sodium nitrate | 4 | 8 | 2 | 2 |  | 20 |  | 4 | 6 | .5 |
| Potassium nitrite |  |  |  |  |  |  |  | 6 |  |  |
| Potassium nitrate |  |  |  |  |  |  | 4 |  |  |  |
| Water at 100° C. (for dissolving nitrite and/or nitrate) | 7.5 | 15 | 6 | 10 | 10 | 10 |  | 7.5 |  |  |

Another method of producing the product is to make a mechanical mixture of the salts to be united, and then heat the mixture to a point where only the lower melting substance other than sodium chloride can be melted. The sodium chloride remains unmelted. The melted substance naturally distributes itself over the surface of the sodium chloride and reaches an equilibrium distribution. If desired the material may be mixed, or it may be left stationary, and cooled. A suitable composition for such treatment is

| | Per cent |
|---|---|
| Sodium chloride | 93 |
| Sodium nitrite | 2 |
| Sodium nitrate | 5 |

Still another method is to discharge small particles of fused liquid nitrite, nitrate, or combined nitrite and nitrate directly onto cold grains of sodium chloride. The cold grain chills and unites the fused particle to it. This may be accomplished by making a liquid spray of the fused salt, and scattering into the spray a stream of cold sodium chloride grains from a centrifugal member or other suitable scattering device.

Suitable apparatus for conduct of the process may be devised in many ways.

In Fig. 1 there is shown a schematic representation of the spraying process.

In Fig. 1ª there is shown an enlarged grain of sodium chloride containing a heart-like center of curing salt and carrying a coating of curing salt.

In Fig. 2 there is shown one form of apparatus for carrying out the process.

Numeral 10 represents sodium chloride grains to be coated. These may be grains having a heart-like center as described. These are formed into a mass 11 providing a surface 12 to be sprayed at 13 with liquid 14. Thereafter, or at the time of spraying, the sprayed grains are mixed with all other grains as at 15, to the end that uniformity is attained. Then the mass may be cooled as a mass, as at 16 and may be ground as at 17, or the mass 15 may be separated into small units, or into individual grains, as at 18 and cooled. The final product is a grain of sodium chloride 19 with a coating 20 which may contain, nitrite, nitrate, or combined nitrite and nitrate. There may be an interior heart 19ª of like variable composition.

Apparatus may comprise a mixer 21, heated, as by an oil jacket 22 to provide a heated mass of sodium chloride grains 23. A suitable agitator 24 is provided. A spraying device or nozzle 25 is positioned above the level of sodium chloride. It is fed with hot liquid, either fused or in solution, by pipe line 26 which reaches to the bottom of a pot 27 in which the liquid 28 is prepared. The pot is closed and is provided with a gas space 29 for pressure to discharge the liquid. Pressure is supplied by a connection 30 leading to a pressure supply of gas 31, preferably a dry gas. This may be air, but in some instances where there is a tendency for nitrite to oxidize at the temperature of the liquid 28, nitrogen or other inert gas may be used. The mixer is closed and where an aqueous solution is used to spray the grains, an exhaust system 32 is provided for drawing out the vapor created by evaporating the water from the sprayed liquid.

Any suitable heating means may be provided for the mixer 21 and for the pot 27, according to the temperatures required. Where an aqueous solution is employed, oil heat is sufficient in both instances. A temperature of 250° C. for the salt is more than sufficient where mixed nitrite and nitrate are employed, whether in solution or fused. An oil heater 33 is supplied with oil by pump 34. Hot oil flows from the heater through pipe line 35. This branches through a valved connection 36 leading to an oil jacket 37 on the pot 27, and valved connection 38 leading to the mixer 21. The oil jacket 37 on the pot 27 is also connected for discharge by a line 38ª to a jacket 39 around the line 26 leading to the nozzle structure 25. Pipe line 40 carries hot oil from the pipe jacket 39 to a line 41 which carries the oil discharge from the mixer jacket 22 to the oil pump 34.

Since the solution does not need to be heated as high as a fused mass, the temperature of the liquid in the pot may be kept lower than the temperature of the oil going to the mixer.

While I prefer the grains to be hot grains, it is readily appreciated that cold grains might be sprayed. The use of cold grains immediately chills a fusion mass, and it is not thereafter easy to render the mass uniform in composition.

By the process which forms heart-like centers in sodium chloride grains, 100% inclusion of the meat-curing salt (nitrite and/or nitrate) can be assured only when the sodium chloride is at least about 80% of the whole mass. Otherwise, some of the nitrite-nitrate is left outside of the crystal in separate particle form. This mass also could be heated to fuse this non-included meat-curing salt to form a coating over the heart-containing crystals.

By fusing a mass of nitrite and nitrate only a small amount of sodium chloride may be dissolved in the fusion. For example at 270° C. a mass consisting of 60% sodium nitrite and 40% sodium nitrate will dissolve only about 5% of sodium chloride.

Where it is the desire to have grains consisting of sodium chloride, nitrite and nitrate, it is seen that such grains with 80% or over of sodium chloride may be readily made by the evaporative process using a water solution containing all the salts in dissolved form. Grains with a small content, such as 6% of sodium chloride may be made by fusing all the salts together. For intermediate content of sodium chloride the present invention is applicable to produce products having a wide range of composition.

Various changes and modifications in the process and apparatus may be made without departing from the spirit and scope of the invention as expressed in the appended claims.

I claim:

1. Meat-curing salt product comprising essentially grains of sodium chloride having a coating containing meat-curing nitrite and meat-curing nitrate fused together.

2. Meat-curing salt product comprising essentially grains of sodium chloride having a coating containing meat-curing salt selected from the group of meat-curing nitrites and nitrates, said coating being the solidified residue of a liquid fusion containing said meat-curing salt.

3. Meat-curing salt product comprising essentially grains of sodium chloride having on the interior a heart-like center containing meat-curing salt selected from the group of meat-curing nitrites and nitrates, and having an exterior coating containing meat-curing salt selected from the group of meat-curing nitrates and nitrites.

4. The method of forming a meat-curing salt product which comprises coating hot grains of sodium chloride with a liquid fusion containing meat-curing salt selected from the group of meat-curing nitrites and nitrates, thoroughly mixing the hot grains whereby to distribute the fusion mass uniformly throughout the hot grains, and cooling the mass to fix the meat-curing salt as a solid coating on the grains.

5. The method of forming a meat-curing salt product which comprises coating hot grains of sodium chloride with a liquid fusion containing meat-curing salt selected from the group of meat-curing nitrites and nitrates, thoroughly mixing the hot grains whereby to distribute the fusion mass uniformly throughout the hot grains, extending the hot mass while said coating is liquid, whereby to separate grains, and cooling the separated portions of the mass to fix the curing salt as a solid coating on the grains.

6. The method of forming a meat-curing salt product which comprises coating hot grains of sodium chloride with a liquid mass comprising water and meat-curing salt selected from the group of meat-curing nitrites and nitrates, evaporating water from the coating whereby to leave on the hot grains a liquid fusion mass containing said meat-curing salt, thoroughly mixing the hot grains whereby to distribute the fusion mass uniformly throughout the hot grains, and cooling the mass to fix the meat-curing salt as a solid coating on the grains.

7. The method of forming a meat-curing salt product which comprises coating hot grains of sodium chloride with a liquid mass comprising water and meat-curing salt selected from the group of meat-curing nitrites and nitrates, evaporating water from the coating whereby to leave on the hot grains a liquid fusion mass containing said meat-curing salt, thoroughly mixing the hot grains whereby to distribute the fusion mass uniformly throughout the hot grains, extending the hot mass while said coating is liquid, whereby to separate grains, and cooling the separated portions of the mass to fix the curing salt as a solid on the grains.

8. The method of forming a meat-curing salt product which comprises coating cold grains of sodium chloride with a hot solidifiable fusion containing meat-curing salt selected from the meat-curing nitrites and nitrates, said cold grains effecting solidification of the fusion and union of the resulting solid to said grains.

9. The method of forming a meat-curing salt product which comprises coating grains of sodium chloride with meat-curing nitrite and meat-curing nitrate, said nitrite and nitrate being intimately associated as a cooled residue of a fused mass.

10. The method of forming a meat-curing salt product which comprises coating grains of sodium chloride with substance including meat-curing nitrite fused onto the grain of sodium chloride.

11. The method of forming a meat-curing salt product which comprises coating grains of sodium chloride with substance including meat-curing nitrate fused onto the grain of sodium chloride.

12. The method of coating sodium chloride grains which comprises making a mechanical mixture of sodium chloride grains and meat-curing salt selected from the meat-curing nitrites and nitrates, heating the mass to fuse the meat-curing salt and to retain sodium chloride grains without fusion, whereby the fused salt coats the sodium chloride grains, and cooling the coated grains to effect solidification of the fused coating onto the sodium chloride grains.

ENOCH L. GRIFFITH.